United States Patent [19]

Workman et al.

[11] Patent Number: 5,370,066

[45] Date of Patent: Dec. 6, 1994

[54] METHOD FOR MAKING SOLID WASTE MATERIAL ENVIRONMENTALLY SAFE USING HEAT

[75] Inventors: Jason Workman, Secaucus, N.J.; Peter DellaValle, Hampden, Mass.

[73] Assignee: Phoenix Environmental, Ltd., Montgomery, Pa.

[21] Appl. No.: 148,034

[22] Filed: Nov. 3, 1993

Related U.S. Application Data

[60] Continuation of Ser. No. 54,758, Apr. 29, 1993, abandoned, which is a division of Ser. No. 908,760, Jul. 2, 1992, Pat. No. 5,230,292.

[51] Int. Cl.$^5$ .............................................. F23B 5/00
[52] U.S. Cl. ................................. 110/346; 110/210; 110/211; 110/238
[58] Field of Search ................ 110/210, 211, 238, 346

[56] References Cited

U.S. PATENT DOCUMENTS

| | | |
|---|---|---|
| 1,130,212 | 3/1915 | Steere . |
| 2,800,091 | 7/1957 | Lotz et al. ............... 110/266 |
| 2,917,011 | 12/1959 | Korner . |
| 2,979,000 | 4/1961 | Sifrin et al. . |
| 2,983,847 | 5/1961 | Spengler . |
| 3,440,800 | 4/1969 | Messen-Jaschin . |
| 3,656,441 | 4/1972 | Grey et al. . |
| 3,722,733 | 3/1973 | Neumann . |
| 3,771,468 | 11/1973 | Kelly . |
| 3,780,675 | 12/1973 | Frye et al. . |
| 3,832,519 | 8/1974 | Wolf et al. . |
| 3,834,326 | 9/1974 | Sowards . |
| 3,910,207 | 10/1975 | Altmann . |
| 3,913,499 | 10/1975 | Watts . |
| 3,918,374 | 11/1975 | Yamamoto et al. . |
| 3,996,862 | 12/1976 | Besik et al. . |
| 4,012,301 | 3/1977 | Rich et al. . |
| 4,038,108 | 7/1977 | Engel et al. . |
| 4,050,389 | 9/1977 | Von Dreusche, Jr. ............. 110/210 |
| 4,167,463 | 9/1979 | Conrad . |
| 4,181,504 | 1/1980 | Camacho . |
| 4,213,404 | 7/1980 | Spaulding . |
| 4,253,409 | 3/1981 | Wormser . |
| 4,266,948 | 5/1981 | Teague et al. . |
| 4,279,208 | 7/1981 | Guillaume et al. . |
| 4,291,634 | 9/1981 | Bergsten et al. . |
| 4,308,807 | 1/1982 | Stokes . |
| 4,320,709 | 3/1982 | Hladun . |
| 4,346,661 | 8/1982 | Nakamura . |
| 4,367,130 | 1/1983 | Lemelson . |
| 4,384,968 | 5/1983 | Polizzotti et al. . |
| 4,397,823 | 8/1983 | Dimpfl . |
| 4,398,471 | 8/1983 | Thomanetz . |
| 4,408,985 | 10/1983 | Anderson et al. . |
| 4,411,695 | 10/1983 | Twyman . |
| 4,417,529 | 11/1983 | Fujimoto et al. . |
| 4,432,344 | 2/1984 | Bennington et al. . |
| 4,438,705 | 3/1984 | Basic, Sr. . |
| 4,438,706 | 3/1984 | Boday et al. . |
| 4,447,262 | 5/1984 | Gay et al. . |
| 4,479,443 | 10/1984 | Faldt et al. . |
| 4,509,434 | 4/1985 | Boday et al. . |
| 4,526,712 | 7/1985 | Hirano et al. . |
| 4,539,916 | 9/1985 | Paoluccio . |

(List continued on next page.)

FOREIGN PATENT DOCUMENTS 4120061  12/1993  Germany .
WO9302750  2/1993  WIPO .

Primary Examiner—Henry C. Yuen
Attorney, Agent, or Firm—Panitch Schwarze Jacobs & Nadel

[57] ABSTRACT

Harmful constituents are removed from solid hazardous waste material by heating the waste in the presence of a continuous flow of oxygen until the waste material becomes an agitated molten aggregate and generates effluvia. The effluvia is conducted through a high temperature zone to destroy organic and other harmful constituents. The effluvia is further processed to achieve acceptable environmental quality. The effluvia processing includes a dual reburn/heat exchanger compartment. The generated molten aggregate is thoroughly mixed and hardens into a ceramic-like aggregate which is environmentally safe.

13 Claims, 4 Drawing Sheets

U.S. PATENT DOCUMENTS

| | | | |
|---|---|---|---|
| 4,552,667 | 11/1985 | Shultz . | |
| 4,574,714 | 3/1986 | Bach et al. . | |
| 4,579,067 | 4/1986 | Peters . | |
| 4,582,004 | 4/1986 | Fey et al. . | |
| 4,599,955 | 7/1986 | Hepworth et al. . | |
| 4,602,574 | 7/1986 | Bach et al. . | |
| 4,615,283 | 10/1986 | Ciliberti et al. . | |
| 4,615,285 | 10/1986 | Bentell et al. . | |
| 4,631,384 | 12/1986 | Cornu . | |
| 4,644,877 | 2/1987 | Barton et al. . | |
| 4,651,656 | 3/1987 | Wallner et al. . | |
| 4,685,220 | 8/1987 | Meenan et al. . | |
| 4,685,404 | 8/1987 | Sheppard et al. . | |
| 4,688,495 | 8/1987 | Galloway . | |
| 4,695,447 | 9/1987 | Shultz . | |
| 4,695,448 | 9/1987 | Anthony . | |
| 4,702,808 | 10/1987 | Lemelson . | |
| 4,718,362 | 1/1988 | Santen et al. . | |
| 4,724,776 | 2/1988 | Foresto . | |
| 4,732,091 | 3/1988 | Gould . | |
| 4,759,300 | 7/1988 | Hansen et al. . | |
| 4,771,361 | 9/1988 | Varga . | |
| 4,781,171 | 11/1988 | Hemsath . | |
| 4,793,270 | 12/1988 | Karasek et al. . | |
| 4,821,653 | 4/1989 | Jones . | |
| 4,848,995 | 7/1989 | Samish . | |
| 4,873,930 | 10/1989 | Egense et al. . | |
| 4,886,000 | 12/1989 | Holter et al. . | |
| 4,909,160 | 3/1990 | Frick et al. . | |
| 4,922,841 | 5/1990 | Kent | 110/238 |
| 4,958,578 | 9/1990 | Houser | 110/238 |
| 4,969,405 | 11/1990 | Goodrich | 110/210 |
| 5,177,304 | 1/1993 | Nagel | 588/201 |
| 5,191,154 | 3/1993 | Nagel | 588/201 |
| 5,202,100 | 4/1993 | Nagel et al. | 423/5 |

METHOD FOR MAKING SOLID WASTE MATERIAL ENVIRONMENTALLY SAFE USING HEAT

Cross-Reference to Related Applications

This application is a continuation of application Ser. No. 08/054,758, filed Apr. 29, 1993, now abandoned, which is a division of application Ser. No. 07/908,670, filed Jul. 2, 1992, now U.S. Pat. No. 5,230,292.

FIELD OF THE INVENTION

This invention relates to a method and apparatus for making solid hazardous waste material environmentally safe using heat. More particularly, this invention relates to a method and apparatus for continuously modifying solid hazardous waste material to a ceramic-like composition using high temperatures.

BACKGROUND OF THE INVENTION

The disposal of solid waste material, particularly hazardous waste material, is a continuing problem. Hazardous waste materials must be properly handled to avoid harm to humans and the environment.

Incineration of waste material is a principal method of waste disposal. However, the ash by-product of incineration (commonly called fly ash and bottom ash) can itself be considered a hazardous waste since it may contain heavy metals and other hazardous substances such as arsenic and organic compounds such as dioxins. Such substances are dangerous to humans and will contaminate the environment unless the ash is disposed of in a safe manner, such as in a regulated landfill. Disposal represents an ever-present risk to the environment. It is therefore desirable to provide a method and apparatus for further transforming ash and other hazardous wastes to materials which are suitable for environmentally safe disposal or even useful products. These other hazardous wastes can also include chipped metal waste, such as used paint cans, white appliances, waste steel with waste oil, electroplated materials and aluminum stampings. Also included are asbestos, low radioactivity mixed wastes and polychlorinated biphenyls (PCBs). It is also desirable to provide a method and apparatus for the transformation of solid waste materials considered to be extremely hazardous such as "sharps" and other solid medical wastes.

Methods and apparatus for reducing waste materials to separable constituents have been proposed in the past, but none are known to be widely used commercially. Deficiencies in high temperature waste treatment processes have limited their utility. Difficulties in processing the effluvia of the combustion process which are themselves hazardous have required costly special treatment. Other deficiencies are that gas/electrode plasma systems used for heating the hazardous waste have very limited duty life, i.e., an average life expectancy of 50 hours.

SUMMARY OF THE INVENTION

Briefly stated, the present invention relates to a process for removing harmful constituents from solid waste material. A particulate mix of the solid waste material is fed continuously into a reaction chamber having three zones. The particulate mix is heated in a first zone of the reaction chamber in the presence of a continuous flow of oxygen introduced through a rotating and retractable assembly until the solid waste material becomes an agitated molten aggregate and generates an effluvia containing particulate matter. The effluvia is conducted into a second zone of the reaction chamber where the temperature of the second zone is high enough to destroy substantially all organic material in the effluvia. An excess of molten aggregate is conducted from the first zone to a third zone of the reaction chamber where the molten aggregate is thoroughly mixed. The effluvia is conducted from the second zone of the reaction chamber and treated to remove pollutants and achieve acceptable environmental release quality.

The present invention also relates to an apparatus for removing harmful constituents from solid waste material. The apparatus includes a reaction chamber having three zones. Means for continuously feeding a particulate mix of the solid waste material into the first zone of the reaction chamber are provided. Additionally provided are means for introducing oxygen into the first zone of the reaction chamber, the first zone of the reaction chamber being adapted to react the mix in the chamber in the presence of oxygen until the solid waste becomes an agitated molten aggregate and the temperature within the first zone of the reaction chamber above the bath of molten aggregate is high enough to destroy substantially all of the harmful constituents of the effluvia generated by the formation of the molten aggregate. The apparatus also includes means for further mixing the agitated molten aggregate in the first zone of the reaction chamber, means for conducting excess molten aggregrate from the first zone of the reaction chamber, means for conducting the effluvia generated by the formation of the molten aggregate from the first zone of the reaction chamber into a second zone of the reaction chamber, the second zone of the reaction chamber being adapted for reburning the effluvia therein to destroy substantially all organic material, means for treating the effluvia to remove substantially all of the remaining particulate and harmful constituents to achieve acceptable environmental quality and means for releasing the treated effluvia into the atmosphere.

BRIEF DESCRIPTION OF THE DRAWINGS

The foregoing summary, as well as the detailed description of the preferred embodiment, will be better understood when read in conjunction with the appended drawings. For the purpose of illustrating the invention, there is shown in the drawings embodiments which are presently preferred; it being understood, however, that this invention is not limited to the precise arrangements and instrumentalities shown. In the drawings.

DETAILED DESCRIPTION OF THE PREFERRED EMBODIMENT

Figure 1:
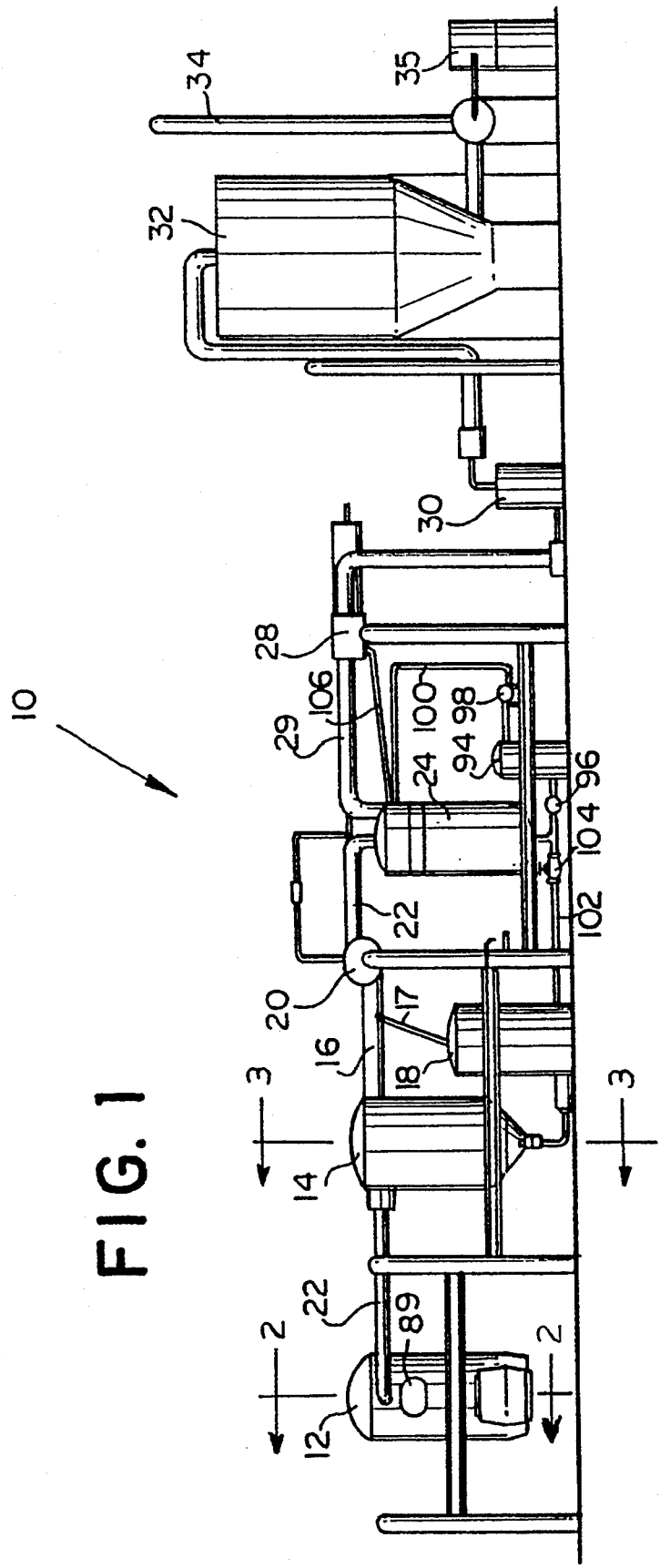
FIG. 1 is an elevational view of the system apparatus used to perform the process of the present invention.

Referring now to the drawings in detail, wherein like numerals indicate like elements, FIG. 1 illustrates the system apparatus 10 for implementing the process for making solid waste material environmentally safe using high temperatures.

The bulk of the system apparatus 10 is housed in a structure having a maximum of 2000 sq. ft. of floor space and a ceiling height of 24 ft. The system apparatus 10 located within the structure includes a reaction chamber 12, dual compartment chamber 14, water-cooled heat exchanger piping 16, water recirculation chamber 18, precipitator vacuum pump 20, water quenching chamber 24, dehumidifier 28 and carbon filters 30. Exterior to the structure are located a baghouse 32, a stack 34 and effluvia monitoring means 35.

Figure 2:
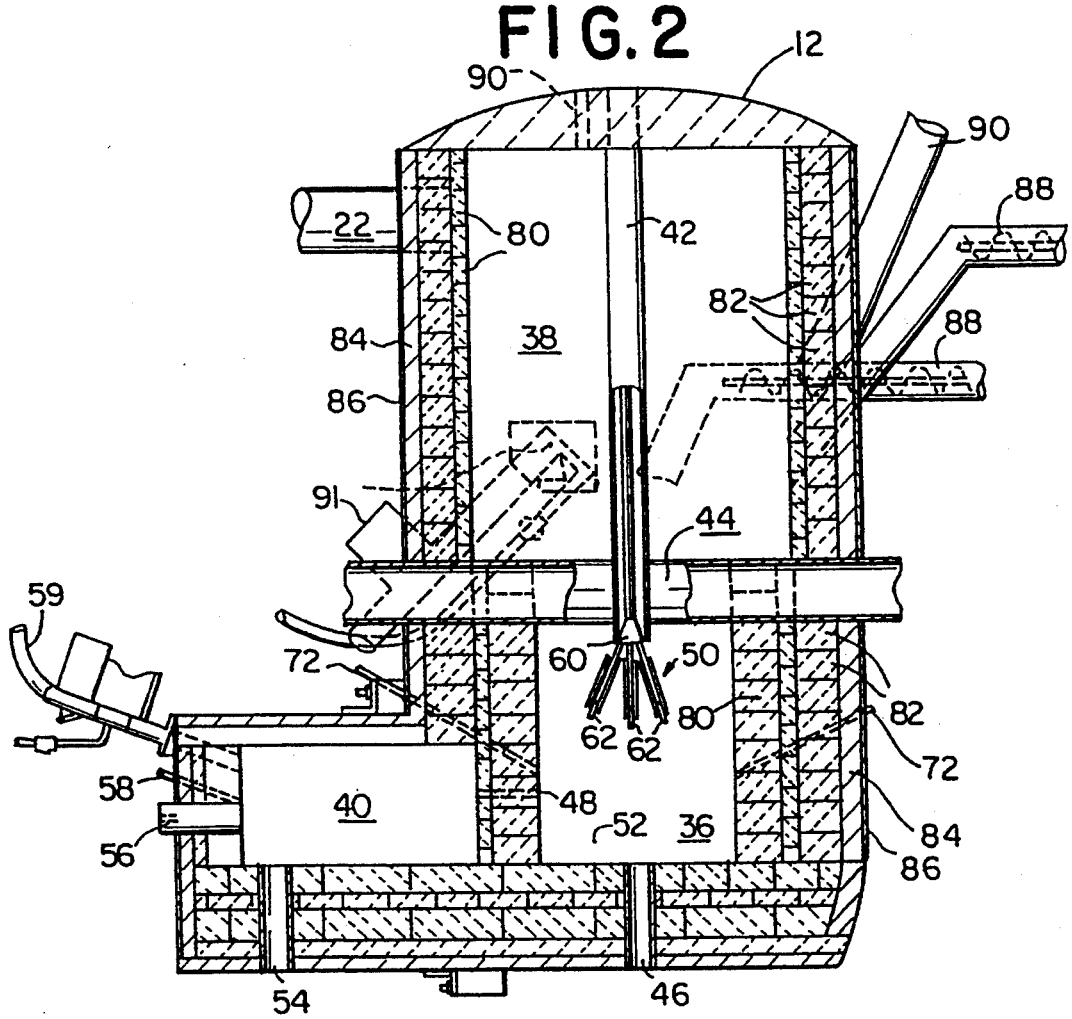
FIG. 2 is an enlarged cross-sectional view of the three-zone reaction chamber of the present invention taken along line 2—2 of FIG. 1.

Now referring to FIG. 2, the primary reaction chamber 12 has three zones having an interior structure of an appropriate combination of hotface refractory 80, lining refractory 82, insulating castable 84 and steel shell 86 materials which satisfy temperature and chemical compatibility requirements. If desired, heat exchangers (not shown) may be installed on an outer surface of the steel shell 86 of the reaction chamber 12 to provide sufficient cooling. A first zone 36 is located below and in communication with a second zone 38. A third zone 40 is in open communication with the first zone 36. The first zone 36 and the third zone 40 are removable to allow for the processing of different waste streams.

The second zone 38 is connected to insulated exhaust piping 22 and includes an oxygen feed assembly 42. Also included in the second zone 38 are auger portals 88, camera portals 90, a safety door 89 and a heating element 91, preferably an air/gas burner. However, one of ordinary skill in the art would recognize that other heating elements such as electric heaters, electric arcs, plasma arcs, lasers and the like could be used in place of the air/gas burners used in the present invention. The second zone 38 is about 36 inches in diameter by about 40 inches in height.

The first zone 36 is in open communication with the second zone 38 through an opening 44. The first zone 36 includes a drain hole 46 having a pneumatic slide gate (not shown) and a portal hole 48 in communication with the third zone 40.

Figure 3:
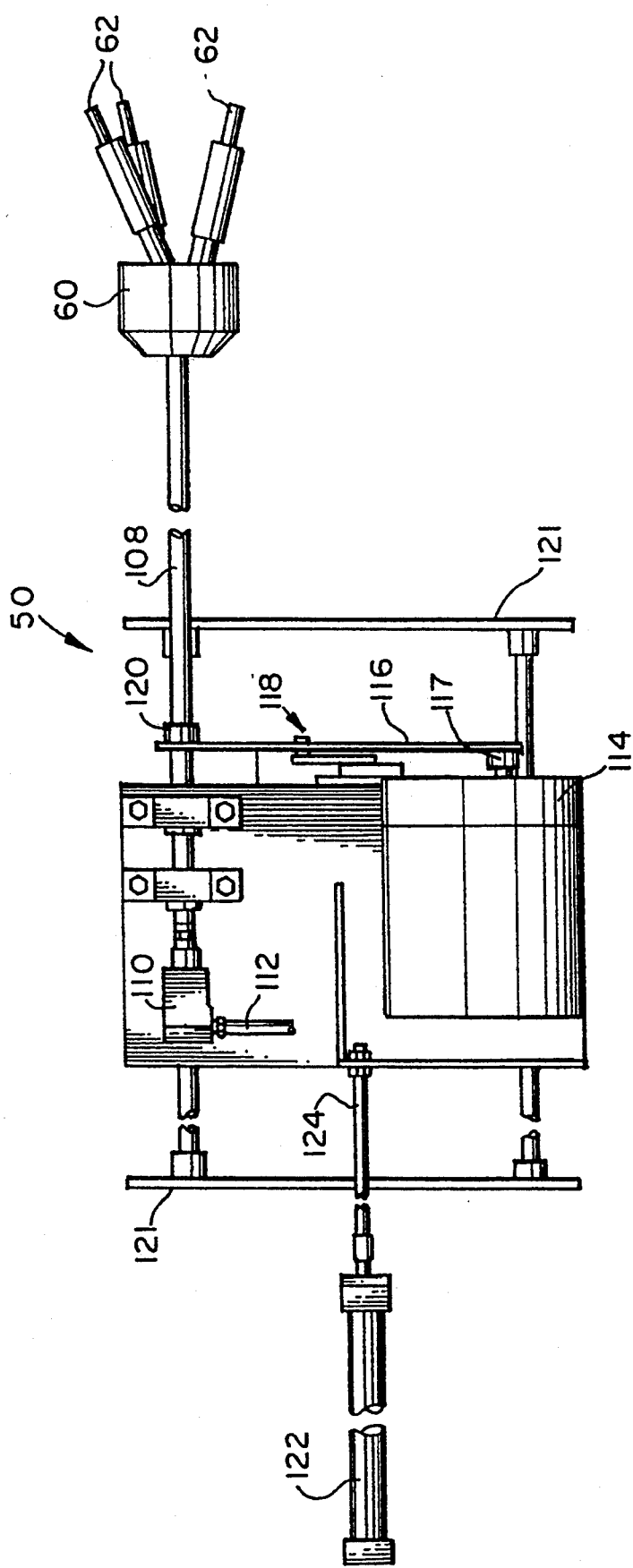
FIG. 3 is an elevational view of the oxygen lance assembly.

Now referring to FIG. 3, the first zone 36 also includes a rotating and retractable oxygen lance assembly 50 which includes a lower manifold 60 having three branching lances 62. The lower manifold 60 is connected to an external pure oxygen supply through an extension pipe 108, a rotary union 110 and an oxygen inlet 112. The pure oxygen supply is located in an isolated area outside of the housing structure. The pure oxygen supply to the lance assembly 50 is regulated by a flow-meter and pressure gauge located in an operations control room (not shown).

The oxygen lance assembly 50 is rotated by a gear motor 114 which drives a roller chain 116 through a driving sprocket 117. The roller chain 116 is tensioned by a tensioner assembly 118. The roller chain 116 engages a driven sprocket 120 attached to the extension pipe 108 causing rotation of the extension pipe, manifold 60 and lances 62.

The oxygen lance assembly 50 is slidably mounted on a fixed frame 121. The assembly 50 is retracted by a cylinder 122 which is attached to the assembly by an extension rod 124.

Referring again to FIG. 2, the first zone 36 further includes four compressed air lances 72. The portal hole 48 is about one inch in diameter and is located about 7.5 inches above a floor 52 of the first zone 36. The first zone 36 is about 19.5 inches in diameter by about 30 inches in height.

The third zone 40 includes the portal hole 48, a drain hole 54 having a pneumatic slide gate (not shown), a burner exhaust port 56 which also functions as a continuous drain hole, two compressed air lances 58 and an air/gas burner 59. This zone has a width of about 8 inches, a length of about 14 inches and a height of about 14 inches. The operational and functional interrelationship of each of the foregoing elements are explained below.

A coherent radiation source (not shown) may be positioned strategically within the structure to utilize its energy to penetrate possible clogged drain holes. Preferably, the coherent radiation source is a 250 watt/cw carbon dioxide laser. The coherent radiation is focused on the drain holes through a series of mirrors.

Figure 4:
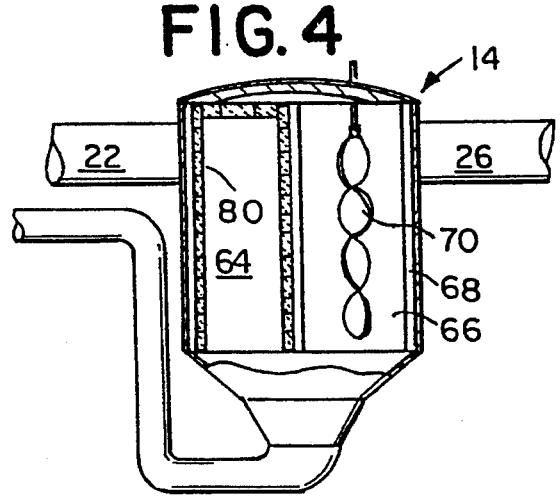
FIG. 4 is a cross-sectional view of the dual reburn-/heat exchanger chamber taken along line 3—3 of FIG. 1.

Referring now to FIG. 4, the system apparatus 10 also includes the dual compartment chamber 14. A first compartment 64, fed by exhaust piping 22, functions as a reburn chamber and includes an air/gas burner (not shown) and an interior having an appropriate combination of hotface refractory 80 and insulating castable 84. A second compartment 66 functions as a rapid cooling chamber and includes a water-jacket 68 and air mixers 70. The dual compartment 14 is connected to heat exchanger piping 26.

Further included in the system apparatus 10 are solid waste material handling means such as augers 88 which can be supplied by hoppers, conveyers, tipping bays, loading ramps and the like. It is well known to those skilled in the art that choices of material handling equipment may vary depending upon the waste streams to be handled.

Figure 5:
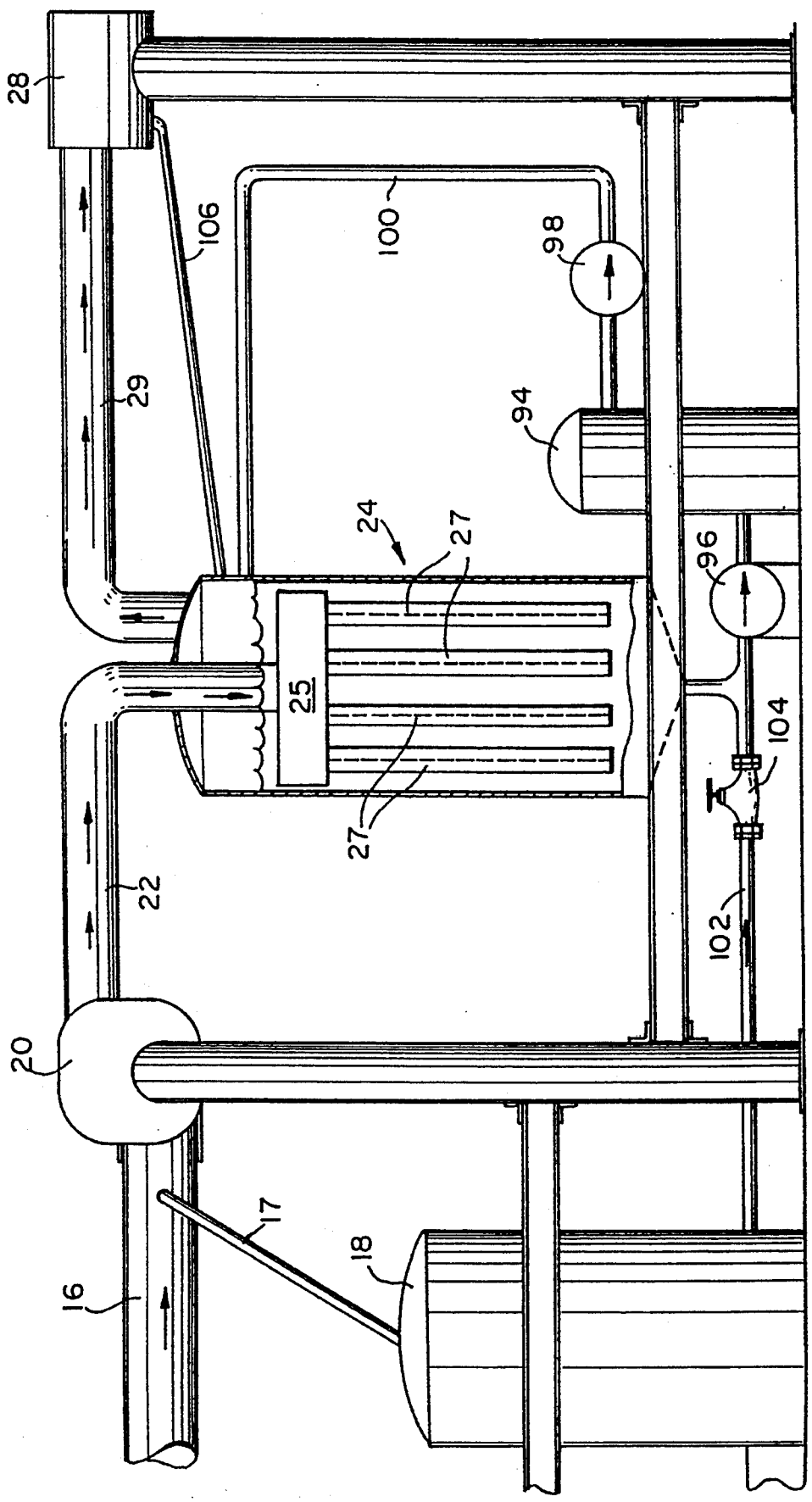
FIG. 5 is a partial elevational view of the system apparatus with a partial cut-away view of the water neutralizing chamber.

Now referring to FIG. 5, the water quench chamber 24 includes an exhaust pipe 29 and a manifold 25 which branches into four perforated pipes 27. The system apparatus 10 further includes a water filter 94 having a supply pump 96 and a return pump 98. A return line 100 connects the return pump 98 to the water quench chamber 24. Water supply line 102 supplies the chamber 24 through a valve 104. The supply line 102 is fed from the water recirculation chamber 18 which also supplies the heat exchanger piping 16 through a supply line 17. Also included in the system apparatus 10 is a dehumidifier water return line 106 connecting the dehumidifier 28 to the chamber 24.

In use, hazardous metal waste materials in the form of chips or other hazardous non-metallic wastes are heated to a sufficient temperature in the presence of pure oxygen to convert the waste material into a molten mass which solidifies into an environmentally safe, potentially recyclable inorganic ceramic-like aggregate material and an effluvia of gas and particulates. The conversion process is continuous. The effluvia is processed to remove hazardous particulate matter and other constituents.

Where the hazardous waste material has little or no BTU value, as in the case of incinerator fly ash, an excitation material such as coal, tires or metal waste is used to obtain the high temperature necessary for the conversion of the waste material and sustain the process. Alternatively, the process can be initiated and sustained by heating elements.

More specifically, on startup, the first zone 36 of the reaction chamber 12 is preheated by the air/gas burner to a level that satisfies the characteristics of the hotface refractory 80 and then the burner is turned off. The third zone 40 is then preheated by an air/gas burner 59 and maintained at a temperature that will maintain the waste material in a molten state. A small bed of coal, preferably oval-shaped rice coal, is introduced into the preheated first zone 36 along with an amount of the hazardous waste material to form a starting material. Oxygen is also introduced at this point through the rotating, retractable oxygen lance 50. The oxygen flow rate is about 350 to about 700 ft$^3$/hour, preferably about 600 ft$^3$/hour. The rotating oxygen lance 50 causes the introduced oxygen to swirl in a vortex within the reaction chamber 12. The swirling movement of oxygen and introduction of compressed air through the lances 72 agitate the bath, enhance the heating process and prevent localized hot spots. Initially, the first zone 36 is filled with waste material to a depth of about 9 inches. Oxygen is introduced and the waste material melts within minutes.

After the starting material is liquified, hazardous waste material is continuously fed into the reaction chamber 12 by the solid waste material handling means. The feed rate is about 16 lbs/minute, which is the typical operating rate for the system described herein. The compressed air lances 72 of the first zone 36 provides further mixing by further agitation of the molten aggregate. After startup, liquid waste materials such as PCBs may be introduced into the pool through the compressed air lances 72. The temperature of the molten waste pool is maintained in excess of 2000° F., preferably at about 2700°–3000° F. The temperature directly above the pool is about 2000°–2500° F.

With the depth of the molten waste pool at 7.5 inches, the molten material drains through the portal hole 48 into the third zone 40 of the reaction chamber 12. If carbonaceous material is present in the pool, carbon boil occurrences can occur where the pool height rises at a disproportionate level relative to the weight of material in the pool until carbonaceous material is exhausted from the pool. The additional height of the first zone 36 (22.5 inches) allows for such occurrences. Additionally, the oxygen lance 50 is retracted during a carbon boil.

In the third zone 40 of the reaction chamber the compressed air lances 58 provide turbulence in the molten material to assure a homogenous melted mixture. When the molten material reaches a depth of 4 inches in the third zone 40, the material flows out of the continuous drain hole 56 into a mold system or receiving container where it solidifies. Alternatively, the molten material can be separated into small globules by a compressed air stream. The small globules are then allowed to cool and harden into individual ceramic-like pebbles.

As a result of the heating of the waste material and its conversion to a molten material, an effluvia of gases and particulates is formed. The effluvia includes products of combustion and inorganics, yet contains virtually no products of incomplete combustion. The effluvia travels through the second zone 38 where the temperature is maintained in excess of 1500° F. The dwell time of the effluvia in the second zone 38 is sufficient to destroy substantially all of the organic material. The effluvia, having a temperature of approximately 1300°–1500° F., flows through the exhaust piping 22, where its temperature drops to approximately 900°–1100° F., to the dual compartment chamber 14. The effluvia enters the reburn compartment 64 of the dual compartment chamber 14 and is maintained at a temperature of approximately 1000°–1200° F. in the reburn compartment by an air/gas burner. Adequate dwelltime of the effluvia in the reburn compartment 64 is provided to destroy substantially all of the remaining organic material. The effluvia, at a temperature of 1000°–1200° F., then passes into the heat exchanger and particulate collection area 66 which includes the water jacket 68 and air mixers 70. The effluvia is rapidly cooled by approximately 400° to 600° F. causing approximately 80% of the particulate matter to precipitate. The total residence time of the effluvia in the reaction chamber 12 and the dual compartment chamber 14 is about 4 seconds.

The effluvia is drawn from the chamber 14 at a flow rate of about 600 to about 1200 ft$^3$/minute by a precipitator vacuum pump 20 through the heat exchanger tube 16 where it is further cooled. The temperature drops an additional 300° F. and fans (not shown) present in the vacuum pump 20 are designed to capture additional particulates from the effluvia and create a positive pressure in the effluvia leaving the vacuum pump.

The fans of the vacuum pump 20 release the effluvia through exhaust piping 22 and into the manifold 25 which branches into perforated pipes 27 below the surface of the water present in the quenching chamber 24. The pipe 27 perforations allow the effluvia to escape into the water which also further cools the effluvia. The water reacts with certain oxides remaining in the effluvia. Thus, sulfur dioxide ($SO_2$) becomes sulfur trioxide ($SO_3$) which, in the water, converts to sulfuric acid ($H_2SO_4$). Moreover, any ozone ($O_3$) is converted to oxygen.

The effluvia bubbling through the pipes 27 is drawn through the water quenching chamber exhaust pipe 29 to dehumidifier 28 which removes essentially all of the moisture from the effluvia. The removed moisture is returned to the chamber 24 by the return line 106. After dehumidification, the effluvia passes through a series of carbon filters 30 having a combined capacity of about 300–600 ft$^3$/min. The carbon filters 30 deodorize and further neutralize the effluvia. The temperature of the effluvia does not exceed 100° F. at this stage.

A filtering baghouse 32 is the last step in the process of purifying the effluvia after the carbon filters. The baghouse 32 consists of concealed cloth filter bags which remove any possible remaining particulate as small in size as less than one micron. The baghouse 32 has an automatic "shaker" system to keep the bags clean of particulate and collectables. At the end of the baghouse 32 is a blower (not shown) which functions to draw the effluvia from the water chamber 24 through the dehumidifier 28, carbon filters 30 and baghouse 32. The baghouse blower then exhausts the cleansed effluvia to the atmosphere via stack 34 at a temperature of 75°–100° F. An effluvia monitoring means 35 is located at the base of the stack 34.

A feature of the present invention is the use of waste material to start and maintain the process. The initial pool of molten material is accelerated, with oxygen and previously described waste, to a large viable pool of high temperature liquid which is capable of handling commercial volumes of waste. This expanded pool engulfs the newly introduced waste material and permits transformation thereof at commercially practicable rates. Tests of the process in an experimental chamber have resulted in waste material treatment rates of 16 lbs/minute without losing air quality for the exhausted effluvia. Present scale-up calculations indicate that rates of 30 to 40 lbs/minute should be capable of being accomplished.

The following examples are provided for illustrative purposes only and are not intended to limit the scope of the present invention. The ordinarily skilled artisan will recognize that the operating parameters of the process of the invention can be varied dependent upon waste stream.

EXAMPLE 1

A sample of solid waste material having the following composition was processed using the process and apparatus described above.

| | |
|---|---|
| Rice coal | 5-10% (wt/wt) |
| Aluminum and steel chips | 75% (wt/wt) |
| Waste glass/sand | 10% (wt/wt) |
| Wood chips | 1-5% (wt/wt) |
| Miscellaneous | 5% (wt/wt) |

The feed rate into the reaction chamber was 33 lbs/minute. The miscellaneous waste material included cutting oils. The oxygen injection rate was 1200 ft³/hour. The process was run for 105 minutes. The following Table I sets forth various parameters measured in the effluent after processing in the reaction chamber but prior to processing in the dual compartment chamber (post-reaction chamber) and at the base of the stack. Effluvia opacity was measured using an argon laser; the observed value was then used to calculate the background particulate readings.

parameters of Example 1 was subjected to elemental analysis. The results are set forth in Table II.

TABLE II

| Element | PPM |
|---|---|
| As | less than 0.05 |
| Cd | less than 0.05 |
| Cr | less than 0.05 |
| Pb | less than 0.05 |
| Se | less than 0.05 |
| Ag | less than 0.05 |
| Ba | less than 1 |
| Hg | less than 0.005 |

EXAMPLE 3

The ceramic-like material produced using the above-described process and apparatus for processing steel waste material was subjected to X-ray diffraction, differential thermal (DTA) and bulk chemical analyses. The X-ray diffraction analysis revealed the presence of four phases in the ceramic-like material, none of which were metals. The steel waste material was oxidized to a mixture of spinels which include magnetite, $Fe_3O_4$, a second ferrite spinel related to franklinite, $M^{2+}Fe_2O_4$, a third phase, FeO (wustite), and a fourth phase at a level too low for identification by X-ray diffraction.

The DTA results indicated the melting of two distinct phases, one at about 1390° C. and another at about 1540° C. Cooling curves suggested a single freezing point at approximately 1358° C. The observed melting points are consistent with phase relations for a pure iron-oxygen system. Initial melting at about 1390° C. occurs with iron in the presence of FeO. The results indicate that trace amounts of FeO are present with a

TABLE I

| | Effluent Quality | | | | | | | | | | |
|---|---|---|---|---|---|---|---|---|---|---|---|
| | Post-Reaction Chamber | | | | Base of Stack | | | | | | |
| TIME (minutes) | $SO_2$ (ppm) | LEL* (%) | CO (ppm) | $O_2$ (% v/v) | $SO_2$ (ppm) | LEL (%) | CO (ppm) | $O_2$ (% v/v) | TEMP. (°F.) | ARGON (mw) | PARTICULATE (mw) |
| 0 | 0.0 | 2 | 0 | 21.2 | 0.0 | 2 | 0 | 21.3 | 66.1 | 1.49 | .119 |
| 41 | 0.0 | 2 | 45 | 21.7 | 0.0 | 2 | 0 | 21.3 | 66.9 | 2.24 | .117 |
| 46 | 0.7 | 3 | 86 | 22.8 | 0.0 | 2 | 1 | 21.3 | 67.0 | 4.20 | .117 |
| 51 | 0.0 | 3 | 113 | 23.1 | 0.0 | 2 | 3 | 21.3 | 67.1 | 3.67 | .117 |
| 56 | 1.4 | 3 | 112 | 24.5 | 0.0 | 2 | 4 | 21.3 | 67.2 | 2.76 | .119 |
| 61 | 1.1 | 3 | 86 | 26.7 | 0.0 | 2 | 7 | 21.4 | 67.4 | 2.50 | .116 |
| 66 | 0.3 | 3 | 147 | 26.8 | 0.0 | 2 | 10 | 21.5 | 67.6 | 2.40 | .115 |
| 71 | 0.0 | 3 | 215 | 25.3 | 0.0 | 2 | 8 | 21.7 | 67.7 | 3.40 | .111 |
| 76 | 2.0 | 4 | 196 | 24.8 | 0.0 | 2 | 10 | 21.6 | 67.8 | 3.00 | .110 |
| 81 | 4.0 | 4 | 184 | 24.4 | 0.0 | 2 | 14 | 21.6 | 67.9 | 2.72 | .110 |
| 86 | 1.7 | 4 | 189 | 26.2 | 0.1 | 3 | 12 | 21.6 | 68.0 | 2.40 | .112 |
| 91 | 1.7 | 4 | 171 | 26.1 | 0.2 | 3 | 9 | 21.6 | 68.1 | 2.27 | .108 |
| 96 | 0.3 | 5 | 574 | 24.8 | 0.3 | 3 | 10 | 21.7 | 68.3 | 1.51 | .107 |
| 101 | 0.7 | 7 | 728 | 23.8 | 0.2 | 3 | 14 | 21.6 | 68.4 | 2.00 | .107 |
| 106 | 0.9 | 7 | 570 | 23.7 | 0.1 | 3 | 21 | 21.6 | 68.5 | 1.53 | .107 |
| 111 | 0.9 | 7 | 546 | 24.4 | 0.1 | 3 | 23 | 21.6 | 68.7 | 1.40 | .092 |
| 116 | 0.6 | 5 | 518 | 25.0 | 0.1 | 2 | 21 | 21.5 | 68.8 | 1.23 | .100 |
| 121 | 1.0 | 5 | 528 | 25.2 | 0.2 | 2 | 38 | 21.6 | 68.9 | 0.85 | .093 |
| 136 | 0.0 | 4 | 485 | 28.5 | | | | | | | |

*LEL: Lower Explosive Limit in % by volume

The average $SO_2$ measured throughout the run after the reaction chamber was 0.98 ppm, average LEL was 4%. At the base of the stack, the average CO measured throughout the run was 12 ppm, average $O_2$ was 21.5% (v/v) and the average effluent temperature was 67.9° F.

EXAMPLE 2

A sample of the solid ceramic-like material produced by the process and apparatus discussed above using substantially the same waste material and operating much more predominant magnetite-spinel phase. The fourth phase, unidentifiable by X-ray diffraction, is likely to be hematite, $Fe_2O_3$.

The results of the bulk chemical analyses are set forth in Table III.

TABLE III

| Oxide | Wt % |
|---|---|
| $Al_2O_3$ | 0.84 |
| $B_2O_3$ | 0.04 |
| BaO | less than 0.01 |

TABLE III-continued

| Oxide | Wt % |
|---|---|
| CaO | 0.17 |
| CoO | 0.05 |
| $Cr_2O_3$ | 0.23 |
| $Fe_2O_3$ | 90 |
| $K_2O$ | 0.02 |
| MgO | 3.26 |
| MnO | 1.14 |
| MoO | 0.04 |
| $Na_2O$ | 0.02 |
| NiO | 0.18 |
| $P_2O_5$ | 0.16 |
| $SiO_2$ | 1.79 |
| SrO | less than 0.01 |
| $TiO_2$ | 0.07 |
| $V_2O_5$ | 0.03 |
| ZnO | 0.09 |
| $ZrO_2$ | 1.48 |

Compositionally, the ceramic-like material is composed of 90 wt % iron oxide (reported as $Fe_2O_3$) with minor amounts of MgO and MnO which along with Ni, Cu, Zn, Al, Or and Fe readily form compounds with a spinel structure.

It is postulated that when certain inorganic waste materials, such as heavy metals, are introduced into the molten oxide environment, they are oxidized and substitute for Fe in the spinel structures. The spinel structure effectively traps the inorganic material preventing leaching from the ceramic-like material generated. Thus, it is important that the process of the present invention be conducted in the presence of adequate oxygen and heat to form iron oxides of magnetite and hematite.

The present invention may be embodied in other specific forms without departing from the spirit or essential attributes thereof and, accordingly, reference should be made to the appended claims, rather than to the foregoing specification, as indicating the scope of the invention.

We claim:

1. A process for removing harmful constituents from solid waste material, comprising the steps of:
    (a) feeding continuously a particulate mix of the solid waste material into a reaction chamber having three zones;
    (b) heating the mix in a first zone of the reaction chamber in the presence of a continuous flow of oxygen introduced through a rotating and retractable assembly until the solid waste material becomes an agitated molten aggregate and generates an effluvia containing particulate matter;
    (c) conducting the effluvia into a second zone of the reaction chamber wherein the temperature of the second zone is high enough to destroy substantially all organic material in the effluvia;
    (d) conducting an excess of molten aggregate from the first zone to a third zone of the reaction chamber where the molten aggregate is thoroughly mixed;
    (e) conducting the effluvia from the second zone of the reaction chamber; and
    (f) treating the effluvia to remove pollutants and achieve acceptable environmental release quality.

2. The process according to claim 1 wherein the particulate mix of step (a) includes a non-combustible material and a combustible excitation material.

3. The process according to claim 2 wherein the non-combustible solid waste material is incinerator ash.

4. The process according to claim 1 wherein the solid waste material is steel waste.

5. The process according to claim 1 further comprising the steps of:
    (g) draining the molten aggregate from the third zone to a collection area; and
    (h) cooling the molten aggregate to form a ceramic-like material.

6. The process of claim 5 wherein the ceramic-like material comprises iron oxide spinels of magnetite and hematite.

7. The process according to claim 1 wherein the temperature in the second zone of the reaction chamber is in excess of 1500° F.

8. The process according to claim 1 further comprising introducing compressed air through lances to provide mixing in the first and third zones.

9. The process according to claim 1 wherein the step of treating the effluvia further comprises:
    (f)(1) passing the effluvia through a reburn compartment of a dual compartment chamber to destroy substantially all of the remaining organic material;
    (f)(2) passing the effluvia through a heat exchanger compartment of the dual compartment chamber to start rapid cooling of effluent and separate out particulates;
    (f)(3) passing the effluvia through a water cooled pipe to further the cooling process and allow precipitating fans to collect particulates;
    (f)(4) passing the effluvia through a water bath to quench the effluvia;
    (f)(5) passing the effluvia through carbon filters; and
    (f)(6) passing the effluvia through filters to remove particulates;
    (f)(7) exhausting the treated effluvia into the atmosphere.

10. The process according to claim 9 wherein the temperature in the reburn compartment of the dual compartment chamber is about 1200° F.

11. The process according to claim 9 wherein the temperature of the effluvia is reduced in the heat exchanger compartment by at least 400° F. in less than four seconds.

12. The process according to claim 1 wherein the continuous flow of oxygen is about 350 ft³/hr to about 700 ft³/hr.

13. The process according to claim 8 wherein liquid waste material containing polychlorinated biphenyl compounds is introduced into the molten aggregate present in the first zone of the reaction chamber through at least one compressed air lance.

* * * * *